US009952432B2

(12) United States Patent
Giannetta et al.

(10) Patent No.: US 9,952,432 B2
(45) Date of Patent: Apr. 24, 2018

(54) ARRANGEMENT FOR, AND METHOD OF, CALIBRATING A WEARABLE APPARATUS TO ELECTRO-OPTICALLY READ TARGETS

(71) Applicant: SYMBOL TECHNOLOGIES, LLC, Lincolnshire, IL (US)

(72) Inventors: Michael J. Giannetta, Centerport, NY (US); Matthew L. Kowalski, Merrick, NY (US); Nicole D. Tricoukes, Seaford, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 8 days.

(21) Appl. No.: 15/093,919

(22) Filed: Apr. 8, 2016

(65) Prior Publication Data
US 2017/0293142 A1    Oct. 12, 2017

(51) Int. Cl.
*G02B 27/01*    (2006.01)
*G06F 3/16*    (2006.01)

(52) U.S. Cl.
CPC ..... *G02B 27/0149* (2013.01); *G02B 27/0172* (2013.01); *G06F 3/167* (2013.01); *G02B 2027/014* (2013.01); *G02B 2027/0138* (2013.01); *G02B 2027/0154* (2013.01)

(58) Field of Classification Search
CPC ............ G02B 27/0149; G02B 27/0172; G02B 2027/014; G02B 2027/0138; G02B 2027/0154; G02F 3/167
See application file for complete search history.

(56) References Cited

U.S. PATENT DOCUMENTS

| 5,742,263 A | 4/1998 | Wang et al. |
| 7,070,109 B2 | 7/2006 | Kato et al. |
| 7,126,558 B1 | 10/2006 | Dempski |
| 8,660,293 B2 | 2/2014 | Sako et al. |
| 2005/0231590 A1* | 10/2005 | Iwasaki ............. H04N 13/0217 348/47 |
| 2013/0278631 A1 | 10/2013 | Border et al. |
| 2014/0291396 A1 | 10/2014 | Molisimo et al. |
| 2016/0035136 A1* | 2/2016 | Sendai ............... G02B 27/0172 345/633 |

(Continued)

FOREIGN PATENT DOCUMENTS

WO    20140195853    12/2014

OTHER PUBLICATIONS

M100 Smart Glasses Product Sheet (www.vuzix.com/Products) 2015.

(Continued)

*Primary Examiner* — Liliana Cerullo

(57) ABSTRACT

An apparatus for electro-optically reading targets is mounted in an orientation on a head of a human operator having eyes for directly viewing a calibration target along a sightline. A light source directs a visible light beam away from the apparatus. A calibration assembly adjustably moves the light source, no matter the orientation of the apparatus, to visually position the light beam on the calibration target that is simultaneously being directly viewed along the sightline in a calibration mode of operation. A data capture assembly is operative, subsequent to the calibration mode, for electro-optically reading the targets on which the light beam is visually positioned in a reading mode of operation.

15 Claims, 5 Drawing Sheets

(56) References Cited

U.S. PATENT DOCUMENTS

2016/0132707 A1* 5/2016 Lindbo .............. G06K 7/10544
                                                    235/462.42
2016/0309143 A1* 10/2016 Fu ...................... H04N 13/0497
2017/0011555 A1* 1/2017 Li ............................. G06T 1/60

OTHER PUBLICATIONS

"Security Cameras, Alarm Systems & Structure Cabling" Comtel Solutions brochure 2015 (www.comtelsol.com/alarms-systems-houston).
"Wearable Augmented Reality" by L. Arguello Sep. 22, 2009 (www.esa.int.gsp/ACT/doc/EVENTS/bmiworkshop).

* cited by examiner

ARRANGEMENT FOR, AND METHOD OF, CALIBRATING A WEARABLE APPARATUS TO ELECTRO-OPTICALLY READ TARGETS

BACKGROUND OF THE INVENTION

The present disclosure relates generally to a wearable apparatus mounted in an orientation on a head of a human operator and operative for electro-optically reading targets, such as bar code symbols, and, more particularly, to an arrangement for, and a method of, calibrating the apparatus to consistently face and read the targets, no matter the orientation of the apparatus on the head.

Moving laser beam readers and solid-state imaging readers, in both handheld and/or hands-free modes of operation, have both been used to electro-optically read targets, such as one- and two-dimensional bar code symbol targets, and/or non-symbol targets, such as documents. In certain venues, for example, in a warehouse, a hands-free reader for taking a product inventory is beneficial, because an operator has his/her hands readily available to manipulate objects, and/or to operate handheld, mobile devices, such as smartphones, tablets, computers, radios, radio frequency (RF) identification (RFID) readers, and like portable devices. One type of hands-free reader is mounted on a head of the operator. The head-mounted reader can be mounted on, and incorporated in, a headset, a headband, a helmet, a hat, a cap, a pair of eyeglasses, and like headgear and eyepieces.

Although generally satisfactory for its intended purpose, the head-mounted reader could be mounted in many different orientations on the head. The operator could remove the reader from, and put the reader back on, his/her head multiple times in different, non-repeatable, locations thereon based on multiple factors, for example, on comfort and convenience. When the reader is worn by different operators whose heads are of different sizes and shapes, the orientations are still more varied. In order to successfully read a target, the operator typically directly views the target with his/her eyes along a sightline, and the head-mounted reader must face, and be aimed at, the same target. However, this might not occur if the head-mounted reader is pointing in one direction in one orientation, and in other directions in other orientations, especially if such orientations are not predictable. The operator is often forced to "hunt" for each target by constantly moving his/her head up-and-down, and/or by twisting his/her head from side-to-side. This not only slows down the reading and degrades reading performance, but also could eventually lead to operator fatigue and possible injury, especially to the operator's neck.

Accordingly, there is a need to consistently and reliably aim the head-mounted reader at the target to be read, no matter the orientation of the head-mounted reader on the head of the operator, to resist operator fatigue and injury, and to enhance reading performance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
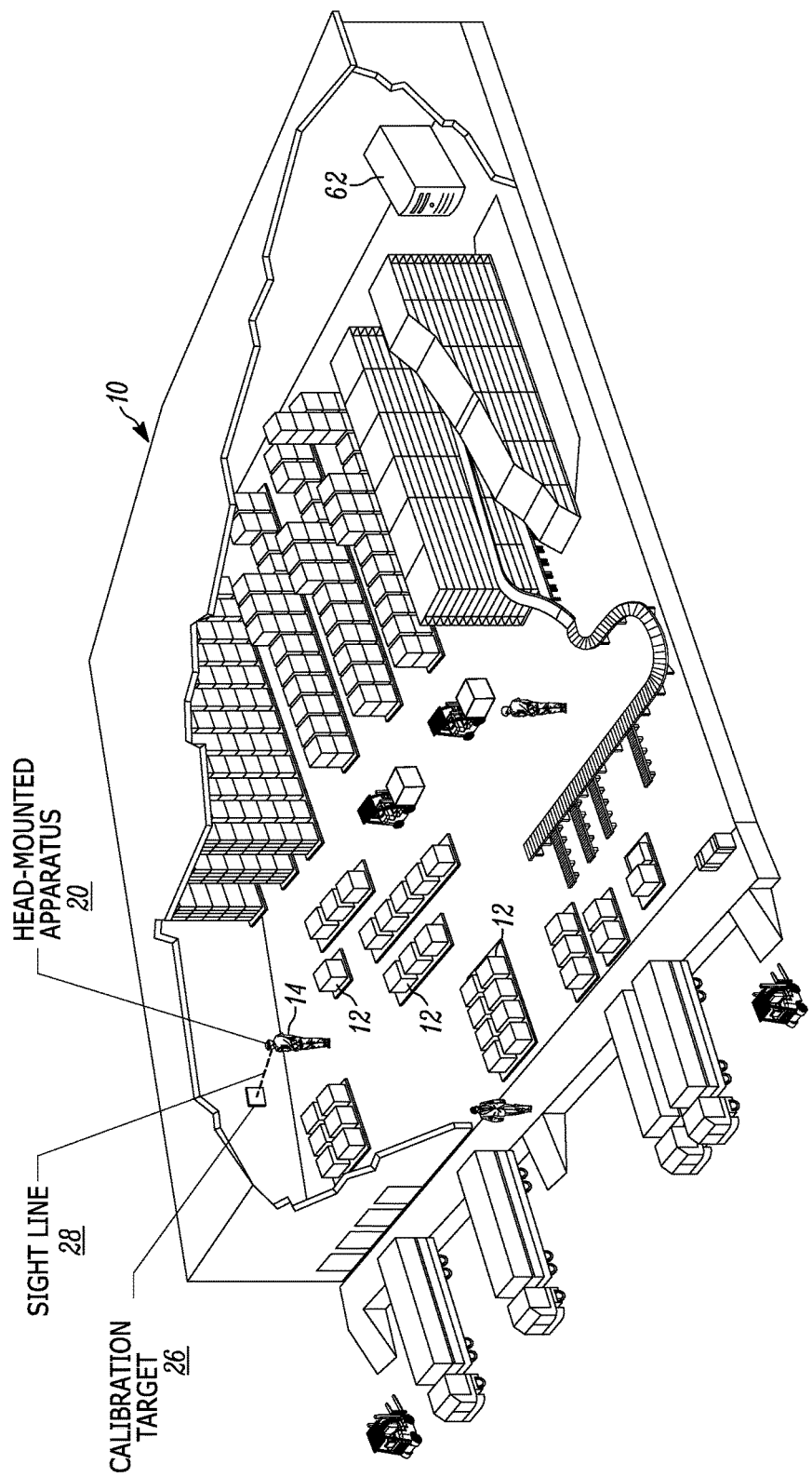
FIG. 1 is a broken-away, perspective view of a warehouse in which a human operator is calibrating a head-mounted apparatus prior to electro-optically reading targets in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to an arrangement for calibrating a wearable apparatus to electro-optically read targets, such as bar code symbols. The arrangement includes a support for mounting the wearable apparatus in an orientation on a head of a human operator having eyes for directly viewing a calibration target along a sightline. A light source, a calibration assembly, and a data capture assembly are all mounted on the head-mounted apparatus. The light source directs a visible light beam away from the head-mounted apparatus. The calibration assembly adjustably moves the light source, no matter the orientation of the head-mounted apparatus, to visually position the light beam on the calibration target that is simultaneously being directly viewed along the sightline in a calibration mode of operation. The data capture assembly is operative, subsequent to the calibration mode, for electro-optically reading the targets on which the light beam is visually positioned in a reading mode of operation. Thus, the calibration assembly consistently and reliably aims the head-mounted reader at the target to be read, no matter the orientation of the head-mounted reader on the head of the operator. Operator fatigue and injury are less likely to occur. Reading performance is less sluggish and enhanced.

In one embodiment, the apparatus is an imaging reader; the data capture assembly includes a solid-state imager for reading the targets by image capture over an imaging field of view in the reading mode; and the light source is an aiming light source for emitting the visible light beam as an aiming light beam. The aiming light beam is directed, and passes, through the imaging field of view. In another embodiment, the apparatus is a moving laser beam reader; the light source is a laser for emitting a laser beam to the target for reflection therefrom; and the data capture assembly includes a photodetector for detecting laser light returning from the target.

The calibration assembly advantageously includes a movable stage on which the light source and/or the data capture assembly are mounted for joint movement, and an actuatable drive for moving the stage in the calibration mode. The drive preferably moves the visible light beam in mutually orthogonal directions that are generally perpendicular to the sightline in the calibration mode. The drive either manually or automatically moves the stage.

Another aspect of the present disclosure relates to a method of calibrating a wearable apparatus to electro-optically read targets. The method is performed by mounting the wearable apparatus in an orientation on a head of a human operator having eyes for directly viewing a calibration target along a sightline, by directing a visible light beam away from the head-mounted apparatus, by adjustably moving the light beam, no matter the orientation of the head-mounted apparatus, by visually positioning the light beam on the calibration target that is simultaneously being directly viewed along the sightline in a calibration mode of operation, and by electro-optically reading the targets on which the light beam is visually positioned in a reading mode of operation that is performed after the calibration mode.

Figure 2:
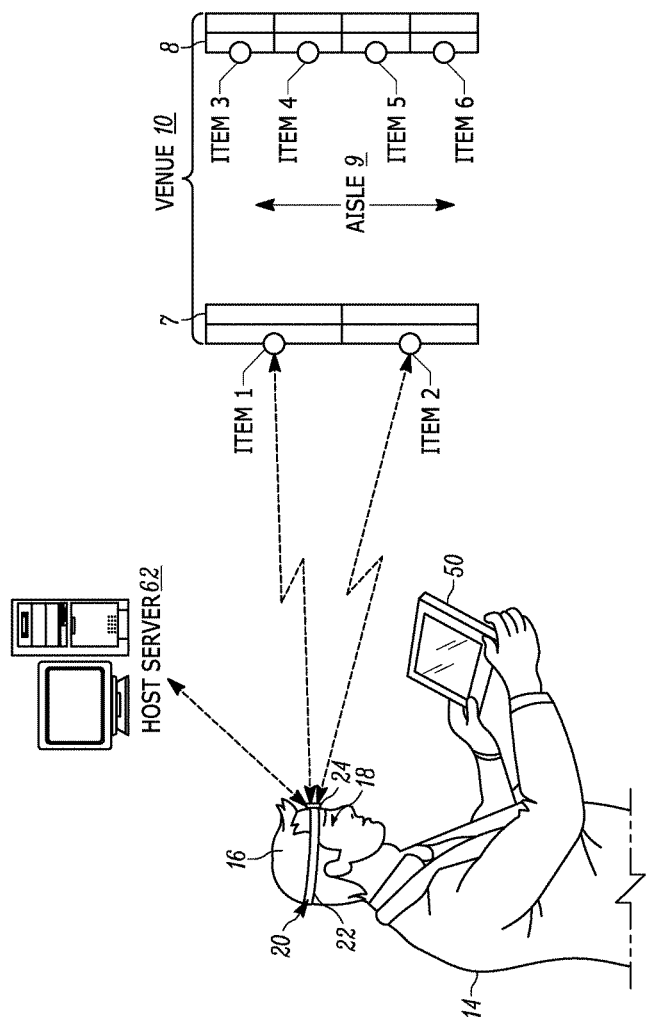
FIG. 2 is a broken-away, partly-diagrammatic, perspective view of the head-mounted apparatus of FIG. 1, on an enlarged scale, during electro-optical reading of the targets after calibration.

Reference numeral 10 in FIGS. 1-2 generally identifies a venue or warehouse having items or products, shown as cuboid cartons 12 in FIG. 1, and shown diagrammatically as items 1-6 on shelves 7-8 separated by an aisle 9 in FIG. 2. Each product/item is associated with, or bears, a target, for example, a bar code symbol, to be electro-optically read by a wearable reader or apparatus 20 mounted on a head 16 of an operator 14 having a pair of eyes 18. This disclosure is not intended to be limited to the illustrated warehouse, because myriad other venues can benefit from the invention disclosed herein.

As best seen in FIG. 2, the head-mounted apparatus 20 includes a module or housing 24 supported on the forehead of the operator 14, and held thereon by a support or headband 22. It will be understood that the illustrated headband 22 is merely exemplary, because many other types of head mountings may be employed. For example, the head-mounted apparatus 20 may be supported by, and incorporated in, a headset, a helmet, a hat, a cap, a pair of eyeglasses, and like headgear and eyepieces.

As described above, the head-mounted apparatus 20 could be mounted in many different orientations on the head 16, which often forces the operator 14 to "hunt" for each target, thereby degrading reading performance, and eventually possibly leading to operator fatigue and injury. In accordance with this disclosure, the head-mounted apparatus 20 is calibrated, as described below, in a calibration mode of operation, to consistently face and read the targets, no matter the orientation of the apparatus 20 on the head 16.

Returning to FIG. 1, in the calibration mode, the operator 14, who is wearing the head-mounted apparatus 20 in an orientation on the head 16, preferably in a comfortable position in which the head 16 is kept still, directly views a calibration target 26 with his/her eyes 18 along a sightline 28. The calibration target 26 is preferably mounted on a wall at a distance within a range of working distances of the apparatus 20 away from the operator 14. The calibration target 26 may be any visible target, for example, a set of concentric circles, or a bar code symbol, or even a reflecting mirror, as described below.

A light source 30 (see FIG. 3), preferably a laser, is mounted in the housing 24, and is activated to emit and direct a visible laser light beam 32 away from the housing 24 along a beam axis toward the wall. While the operator 14 is directly viewing the calibration target 26 along the sightline 28, the laser light beam 32 will strike the wall near, but typically not on, the calibration target 26 due to the orientation of the apparatus 20. The offset between the laser light beam 32 and the calibration target 26 is due to the offset orientation of the apparatus 20.

To compensate for this offset orientation, a calibration assembly, which is also mounted in the housing 24, is activated for adjustably moving the light source 30, no matter the orientation of the apparatus 20, to visually position the light beam 32 on the calibration target 26 that is simultaneously being directly viewed along the sightline 28. Once calibration is completed, a data capture assembly 34, which is also mounted in the housing 24, electro-optically reads the targets associated with the products/items on which the light beam 32 is visually positioned in a reading mode of operation.

In one embodiment, the apparatus 20 is an imaging reader, also known as an imaging scanner, in which case, the data capture assembly 34 includes a solid-state imager, e.g., a one- or two-dimensional charge coupled device (CCD) or a complementary metal oxide semiconductor (CMOS) device, having an array of pixels or sensors, and an imaging lens assembly for capturing return light scattered and/or reflected from the target being imaged, and for projecting the return light onto the array to initiate capture of an image of the target, for reading the target by image capture over an angular imaging field of view 36 in the reading mode. The light source 30 is an aiming laser for emitting the visible light beam 32 as an aiming laser light beam. The aiming laser light beam is directed along the beam axis, and passes, approximately centrally through the imaging field of view 36.

In another embodiment, the apparatus 20 is a moving laser beam reader, also known as a laser scanner, in which case, the light source 30 is a laser for emitting a laser beam to the target for reflection and scattering therefrom, and the data capture assembly 34 includes a photodetector for detecting return laser light reflected and/or scattered from the target.

For either reader embodiment, the calibration assembly includes a dual-axis, movable stage 40 on which the light source 30 and/or the data capture assembly 34 are mounted for joint tilting movement, and an actuatable drive for moving the stage 40 about mutually orthogonal tilt axes (X, Y) that are generally perpendicular to the sightline 28 in the calibration mode. The drive includes dual motors 42, one for tilting the stage 40 about one tilt axis (X), and the other for tilting the stage 40 about the other tilt axis (Y), and a programmed microprocessor or controller 44 for controlling each of the dual motors 42, which are preferably micro-servomotors.

In one mode of operation, the drive manually moves the stage 40 in the calibration mode. For example, a microphone 46 is supported by the housing 24 and is operatively connected to the controller 44 and the dual motors 42. Voice commands uttered by the operator 14 and received by the microphone 46 in the calibration mode are conducted to the controller 44 and the dual motors 42 to move the stage 40 about one or more desired tilt axes, and in one or more steps or angular increments.

Figure 4:
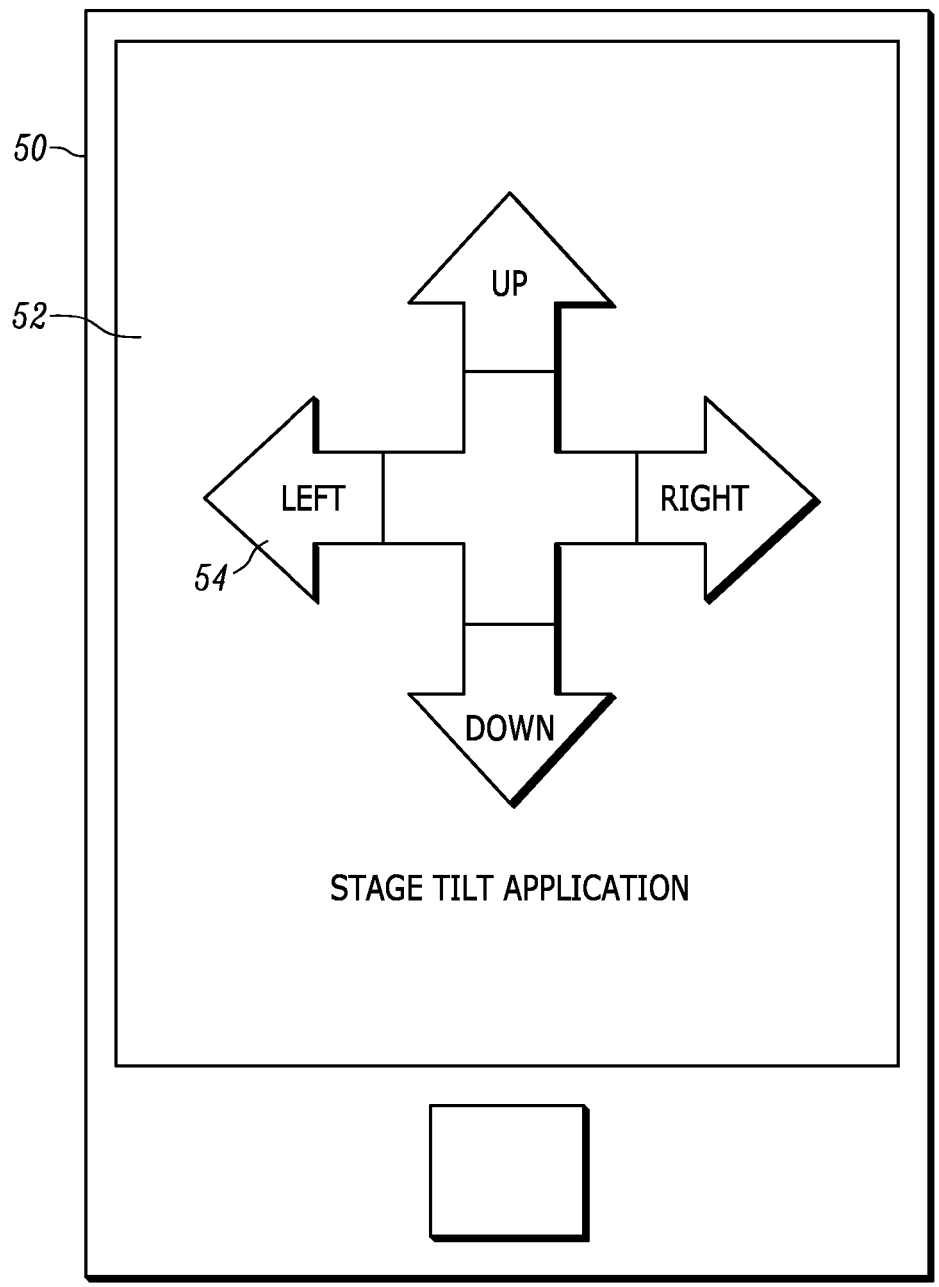
FIG. 4 is a front view of a mobile device operated by the operator during calibration of the head-mounted apparatus of FIG. 2.
Figure 5:
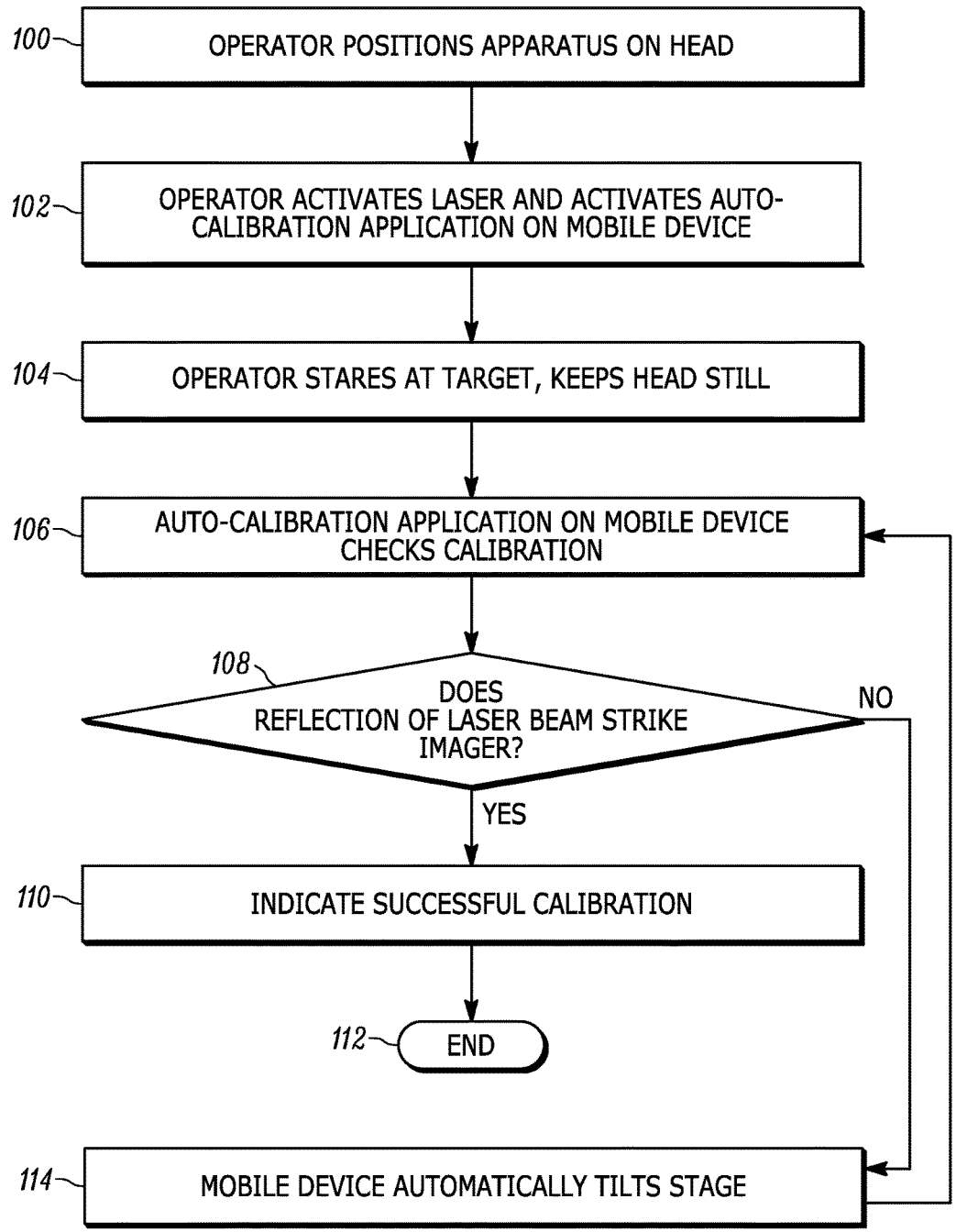
FIG. 5 is a flow chart depicting steps performed in accordance with a method of this disclosure.

It is particularly advantageous, if a wireless radio frequency transceiver, e.g., a Bluetooth® radio 48, is mounted in the housing 24 and is paired with a mobile device 50 (see FIG. 2) to communicate by radio frequency therewith. Bluetooth® is an open wireless standard for exchanging data between electronic devices. Although the illustrated mobile device 50 is shown as an electronic tablet, it will be understood that the mobile device 50 can also be a smartphone, a computer, a radio, a radio frequency (RF) identification (RFID) reader, or any like portable, handheld device. The mobile device 50 has a microphone, which just like the microphone 46, is operative for receiving voice commands uttered by the operator 14 and for communicating such commands to the Bluetooth® radio 48 and, in turn, to the controller 44 and the dual motors 42 to move the stage 40 about one or more desired tilt axes, and in one or more steps or angular increments. Advantageously, as shown in FIG. 4, the mobile device 50 may have a touch display 52 for displaying visual prompts, e.g., up, down, right and left, arrows 54, to visually assist the operator 14 in uttering the voice commands and/or touching the appropriate arrows 54 to move the light beam onto the calibration target 26.

In another mode of operation, the drive automatically moves the stage 40 in the calibration mode. For example, as before, the operator 14, who is wearing the head-mounted apparatus 20 on his/her head 16, directly views the calibration target 26 with his/her eyes 18 along a sightline 28. In this mode, the calibration target 26 is a reflecting mirror. The drive is activated to automatically move the stage 40, and to stop moving the stage 40 in response to capturing a reflection of the light beam 32 by the data capture assembly 34 off the reflecting calibration target 26.

Figure 3:
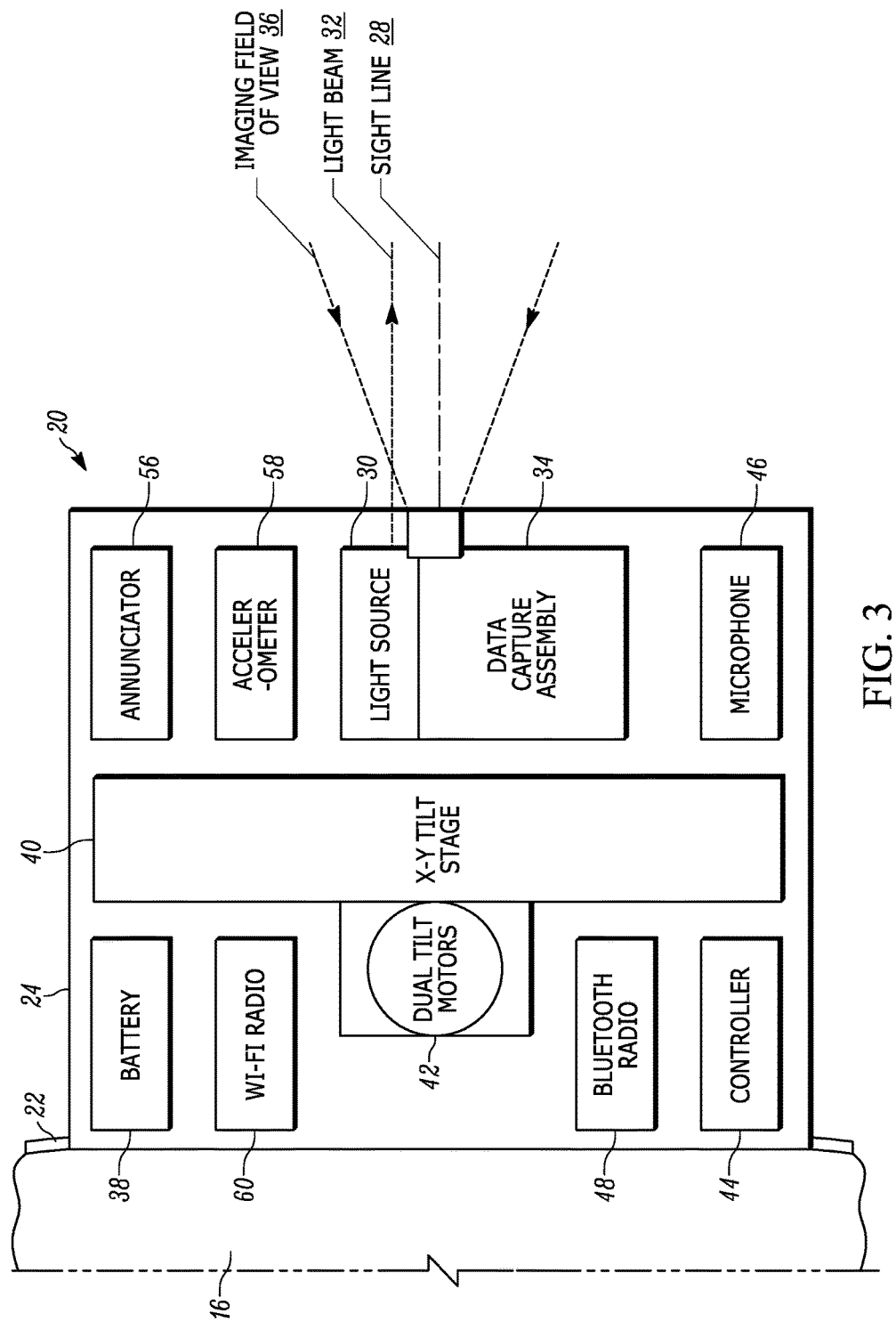
FIG. 3 is an enlarged, overhead, diagrammatic view depicting components of the head-mounted apparatus of FIG. 2.

As also shown in FIG. 3, an annunciator 56, preferably a beeper, is supported by the housing 24, and is operative for visually/audibly indicating that the light beam 32 was successfully visually positioned on the calibration target 26, either manually or automatically, in the calibration mode. An accelerometer 58 is also supported by the housing 24, and is operative for measuring the tilt through which the stage 40 has moved, and to feed this tilt data back to the controller 44. A Wi-Fi transceiver 60 is also supported by the housing 24, and is operative for communicating by radio frequency with a host server 62 (see FIGS. 1-2) over a local area network. Wi-Fi is another open wireless standard for exchanging data between electronic devices. Data captured from the targets associated with the products/items are processed by the host server 62, for example, for monitoring and tracking inventory. A battery 38 is also supported by the housing 24, and is operative for supplying electrical power to all the electrical components in the housing 24.

The aforementioned calibration mode of operation is preferably performed before reading the targets, and may be repeated as often as desired, for example, each time the operator removes and replaces the head-mounted apparatus 20. The calibration procedure need not solely be performed on the calibration target, but can be performed with any target, even on a target on one of the products/items.

The flow chart of FIG. 6 depicts the steps performed when using the mobile device 50 for automatically moving the stage 40 in the calibration mode. In step 100, the operator 14 places the apparatus 20 on his/her head 16. In step 102, the operator 14 activates the light source 30 and an autocalibration application for execution by the mobile device 50. In step 104, the operator 14 stares at the calibration target 26 and keeps his/her head 16 still. In step 106, the autocalibration application checks the calibration. In step 108, it is determined whether the data capture assembly 34 captures a reflection of the light beam 32 from the calibration target 26. If so, then the annunciator 56 indicates a successful calibration in step 110, and the calibration mode ends in step 112. If not, then the mobile device 50 communicates with the apparatus 20 via the Bluetooth® radio 48 and, in turn, with the controller 44, to automatically tilt the stage 40 in step 114, and then steps 106 and 108 are repeated until the successful calibration mode is indicated in step 110 and ends in step 112.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for calibrating a wearable apparatus to electro-optically read targets, the arrangement comprising:
   a support for mounting the wearable apparatus in an orientation on a head of an operator;
   a light source on the wearable apparatus, the light source to direct a light beam away from the wearable apparatus;
   a calibration assembly on the wearable apparatus, the calibration assembly configured to adjustably move the light source to position the light beam on a calibration target in a calibration mode of operation;
   a data capture assembly on the wearable apparatus and configured to, subsequent to the calibration mode, electro-optically read a target on which the light beam is positioned in a reading mode of operation, wherein:
   the calibration assembly includes:
      a stage on which the light source and the data capture assembly are mounted for joint movement; and
      an actuatable drive configured to, in the calibration mode:
         automatically move the stage; and
         stop moving the stage in response to a reflection of the light beam being captured by the data capture assembly off the calibration target.

2. The arrangement of claim 1, wherein:
   the data capture assembly includes a solid-state imager to read the target by image capture over an imaging field of view in the reading mode; and
   the light source is an aiming light source configured to:
      emit the light beam as an aiming light beam, and
      direct the aiming light beam to pass through the imaging field of view.

3. The arrangement of claim 1, wherein the actuatable drive is configured to move the light beam in mutually orthogonal directions in the calibration mode.

4. The arrangement of claim 1, further comprising a microphone on the wearable apparatus and operatively connected to the actuatable drive, wherein the actuatable drive is actuated by voice commands uttered by the operator and received by the microphone in the calibration mode.

5. The arrangement of claim 1, further comprising:
   a wireless radio frequency transceiver on the wearable apparatus and operatively connected to the actuatable drive; and
   a mobile device paired with the transceiver to communicate by radio frequency therewith, wherein the mobile device has a microphone to receive voice commands uttered by the operator and communicated to the transceiver to actuate the actuatable drive in the calibration mode.

6. The arrangement of claim 5, wherein the mobile device has a display configured to display prompts to assist the operator in uttering the voice commands to move the stage.

7. The arrangement of claim 1, further comprising an annunciator on the wearable apparatus, the annunciator to indicate that the light beam was successfully visually positioned on the calibration target in the calibration mode.

8. A method of calibrating a wearable apparatus to be worn on a head of an operator to electro-optically read targets, the method comprising:
   directing a light beam away from the wearable apparatus, the light beam generated by a light source of the wearable apparatus;
   electro-optically reading, by a data capture assembly of the wearable apparatus, a target on which the light beam is positioned in a reading mode of operation, wherein the light source and the data capture assembly are mounted on a stage for joint movement;
   adjustably moving the light beam to position the light beam on a calibration target in a calibration mode, wherein adjustably moving the light beam in the calibration mode comprises:
      automatically moving the stage; and
      stopping the automatic moving of the stage in response to capturing a reflection of the light beam off the calibration target in the calibration mode.

9. The method of claim 8, wherein the reading of the target is performed by image capture over an imaging field of view in the reading mode, and the directing is performed by directing an aiming light beam to pass through the imaging field of view.

10. The method of claim 9, wherein the automatically moving of the stage is performed by moving the light beam in mutually orthogonal directions in the calibration mode.

11. The method of claim 10, wherein the moving of the stage is performed by voice commands uttered by the operator in the calibration mode.

12. The method of claim 11, further comprising pairing a mobile device with the wearable apparatus to communicate by radio frequency therewith, and wherein the moving of the stage is performed by voice commands uttered by the operator to the mobile device in the calibration mode.

13. The method of claim 12, further comprising displaying prompts to assist the operator in uttering the voice commands to move the stage.

14. The method of claim 12, further comprising indicating that the light beam was successfully positioned on the calibration target in the calibration mode.

15. The method of claim 13, further comprising periodically repeating the calibration mode.

\* \* \* \* \*